(12) United States Patent
Green et al.

(10) Patent No.: US 10,479,485 B2
(45) Date of Patent: Nov. 19, 2019

(54) AIRCRAFT LANDING GEAR ASSEMBLY

(71) Applicant: Safran Landing Systems UK Limited, Gloucester (GB)

(72) Inventors: Chris Green, Gloucester (GB); Kay Green, Gloucester (GB)

(73) Assignee: Safran Landing Systems UK LTD (GB)

( * ) Notice: Subject to any disclaimer, the term of this patent is extended or adjusted under 35 U.S.C. 154(b) by 351 days.

(21) Appl. No.: 15/434,295

(22) Filed: Feb. 16, 2017

(65) Prior Publication Data

US 2017/0253323 A1 Sep. 7, 2017

(30) Foreign Application Priority Data

Mar. 4, 2016 (EP) ..................................... 16158757

(51) Int. Cl.
*B64C 25/10* (2006.01)
*B64C 25/34* (2006.01)
*B64C 25/26* (2006.01)

(52) U.S. Cl.
CPC .............. *B64C 25/10* (2013.01); *B64C 25/26* (2013.01); *B64C 25/34* (2013.01)

(58) Field of Classification Search
CPC ................................ B64C 25/10; B64C 25/26
See application file for complete search history.

(56) References Cited

U.S. PATENT DOCUMENTS

| | | | | | |
|---|---|---|---|---|---|
| 2,399,846 A | * | 5/1946 | Bachman | ................ | B64C 25/10 244/104 R |
| 2,692,784 A | * | 10/1954 | McRae, Jr. | ............. | B64C 25/26 403/92 |
| 6,279,853 B1 | * | 8/2001 | Brighton | ................ | B64C 25/26 244/102 R |

FOREIGN PATENT DOCUMENTS

| | | |
|---|---|---|
| DE | 19731305 | 2/1999 |
| EP | 2902316 | 8/2015 |
| FR | 2952146 | 5/2011 |
| GB | 2161202 | 1/1986 |
| WO | 0048903 | 8/2000 |

OTHER PUBLICATIONS

European Search Report for European Application No. 16158757.1-1754, dated Jul. 8, 2016, 9 pages.

* cited by examiner

*Primary Examiner* — Philip J Bonzell
(74) *Attorney, Agent, or Firm* — RatnerPrestia

(57) ABSTRACT

An aircraft landing gear assembly comprising a first member coupled to a second member in parallel by a bolt. First and second mechanical fixings are mounted on the bolt and arranged to apply a clamping force to the members. The first member is arranged in use to be loaded and the second member is anchored to react the load. The assembly includes one or more spacers, each spacer defining one or more land regions and one or more voids. Each spacer is provided between the inner axial face of one of the fixings and the flat outer face of the respective member such that the land regions separate the fixing from the member and the voids are positioned such that angular movement of the fixing due to deflection of the bolt causes the radially outermost point on the fixing sidewall to move into one of the voids.

16 Claims, 5 Drawing Sheets

AIRCRAFT LANDING GEAR ASSEMBLY

This application claims priority to and the benefit of European Patent Application 16158757.1, filed on Mar. 3, 2016, the contents of which are incorporated herein by reference.

BACKGROUND

An aircraft landing gear can include one or more single shear bolted assemblies. In a single shear bolted assembly, a first member is coupled to a second member in a parallel relationship by a bolt with extends through coaxial holes formed in the first and second members. A pair of mechanical fixings can be provided at the ends of the bolt to retain the bolt in place and in some cases to apply a clamping force to outer faces of the members; for example, a first fixing can be the head of a threaded bolt and the second fixing can be a nut which is wound along the free end of the bolt into engagement with an outer face of one of the members.

In the context of an aircraft landing gear, it is common for one member of a single shear bolted assembly to be loaded in use and for the second member to react the load. This loading can cause a moment imbalance in the bolt, causing deflection of the bolt which results in localised stress at regions where the bolt and inner axial faces of the fixings meet. Consequently, the bolt and mechanical fixings are sized to react the moment imbalance.

The present inventors have identified that the weight of a single shear bolted aircraft landing gear assembly can be reduced.

SUMMARY

According to a first aspect of the invention, there is provided an aircraft landing gear assembly comprising:
- a first member having an inner face, a flat outer face and a first hole providing communication between the inner face and outer face;
- a second member having an inner face, a flat outer face and a second hole providing communication between the inner face and outer face, the second member being disposed in parallel with the first member with the inner faces of each member facing one another;
- a bolt provided through the first and second holes to couple the first member to the second member, the bolt being longer than the combined thicknesses of the first and second members so as to have protruding first and second end portions;
- a first mechanical fixing mounted on the first end portion of the bolt and having an inner axial face arranged to apply a clamping force to the flat outer face of the first member;
- a second mechanical fixing mounted on the second end portion of the bolt and having an inner axial face arranged to apply a clamping force to the flat outer face of the second member;
- wherein the first member is arranged in use to be loaded and the second member is anchored to react the load, thereby causing deflection of the bolt in a deflection plane such that a radially outer region of each fixing is biased to move towards the flat outer face of the respective member,
- and wherein the assembly includes one or more spacers, each spacer defining one or more land regions and one or more voids and being provided between the inner axial face of one of the fixings and the flat outer face of the respective member such that the land regions separate the fixing from the member and the voids are positioned such that angular movement of the fixing due to deflection of the bolt causes the radially outermost point on the fixing sidewall to move into one of the voids.

Thus, the members together with the bolt and fixings which join them define a single shear bolted assembly. Each spacer defines one or more land regions arranged to limit how close a fixing can be positioned relative to the outer face of a respective member such that, when tightened, the axial face of the fixing is axially spaced from the outer face of the member. Each spacer further defines one or more voids arranged to accommodate angular movement of the radial outer portion of the fixing due to bolt deflection. The voids are positioned in line with the load applied to the first member in use. As such, the load applied to the first member is reacted primarily by the bolt and the members, rather than by the fixings. Although the land regions can result in some load being transferred to the fixings, the magnitude of the load is smaller than would be the case in a conventional arrangement where substantially all of the inner axial face of a fixing engages an outer face of one of the members. The voids can therefore enable the size and/or weight of the fixing and/or bolt to be reduced without affecting the likelihood of the fixing failing in use, which is particularly advantageous in the context of an aircraft assembly.

The load applied to the first member will result in each fixing having a general pivot axis about which it pivots due to flexing of the bolt. The one or more land regions can be located at or relatively close to the pivot axis, and can extend along it, whereas the one or more voids can be located relatively far from the pivot axis and preferably be sized to prevent the fixing contacting the respective member when the assembly is loaded in use. Each void can be sized and configured to extend across the axial inner face of the respective fixing so as to define one or more free segments of the axial inner face that are not in contact with a land region, the chords of which are generally parallel to the pivot axis of the fixing.

One or more of the spacers can each be defined by a plate located between a fixing and respective member, the plate defining the one or more land regions. The land regions can be projections on the plate, such that the difference in thickness between the land regions and the plate defines the voids. Alternatively, the land regions can be defined by the thickness of the plate, with the voids being defined by holes formed though the plate, the plate including peripheral joining portions which support the land regions. Such embodiments advantageously enable the orientation of the voids to be independent of the orientation of the fixings.

One or more of the spacers can each be defined by projections on an outer axial face of a bush located within one of the holes, the remainder of the axial face of the bush defining the voids. Equally, the remainder of the axial face could be considered to be one or more recesses which define the voids, relative to prominent portion(s) of the axial face. Such embodiments advantageously enable the orientation of the voids to be independent of the orientation of the fixings. In embodiments where bushes are not provided, one or more of the spacers can each be defined by projections on outer axial faces of the members adjacent to the holes.

One or more of the spacers can each be defined by projections on an inner axial face of a fixing, the remainder of the axial face defining the voids. Equally, the remainder of the axial face could be considered to be one or more recesses which define the voids, relative to prominent portion(s) of the axial face.

The members can each define two or more holes and the assembly can include a bolt, fixings and spacers as defined above for each pair of holes. Thus, the landing gear assembly can include a plurality of single shear bolted assemblies, each of which is provided with spacers defining voids to inhibit loads applied to the first member in use being reacted by the fixings of each single shear bolted assembly.

The assembly can further comprise third and fourth members each of which can define one, two or more holes and the assembly can include a bolt, fixings and spacers as defined above for each pair of holes. Thus, the landing gear assembly can include one or more further single shear bolted assemblies defined by third and fourth members, each of which is provided with spacers defining voids to inhibit loads applied to the first member in use being reacted by the fixings of each single shear bolted assembly.

The aircraft landing gear assembly can further comprise:
 a main strut including a joint arranged to be movably coupled to the airframe of an aircraft such that the strut is movable between a stowed condition for flight and a deployed condition for take-off and landing; and
 a lock assembly comprising:
  an elongate pin defining or coupled to the first member and optionally the third member, with the second member and optionally the fourth member being mounted on the main strut; and
  a hook movably coupled to the airframe and being arranged to be moved to an engagement condition for engagement with the pin when the strut is in the stowed condition in order to apply a biasing force to the pin to maintain the strut in the stowed condition.

Thus, the assembly can form a landing gear up-lock.

The or each bolt can be threaded with a head defining the first fixing, the bolt being arranged to be coupled to a nut defining the second fixing. The bolt can include a circumferential groove located at the end of a threaded portion of the bolt.

The holes through member pairs can be coaxial.

The inner faces of the members can be flat.

BRIEF DESCRIPTION OF THE DRAWINGS

Embodiments of the invention will now be described with reference to the accompanying drawings, in which.

DETAILED DESCRIPTION

Figure 1A:
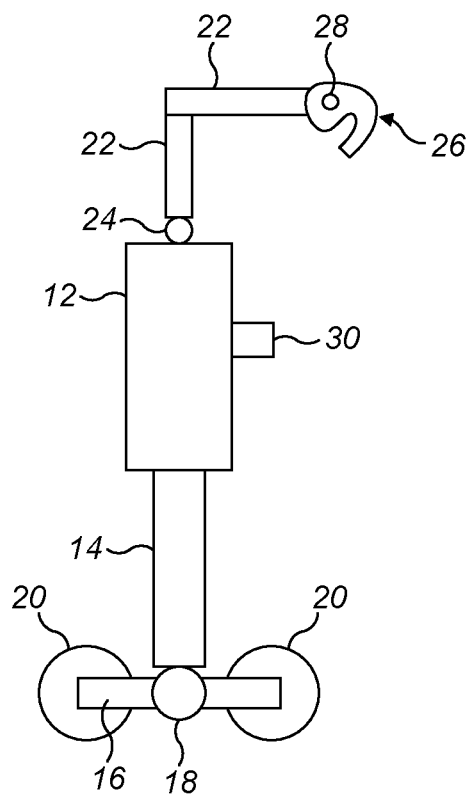
FIGS. 1a and 1b are schematic diagrams of a landing gear assembly according to an embodiment of the invention in a deployed condition and stowed condition, respectively.
Figure 1B:
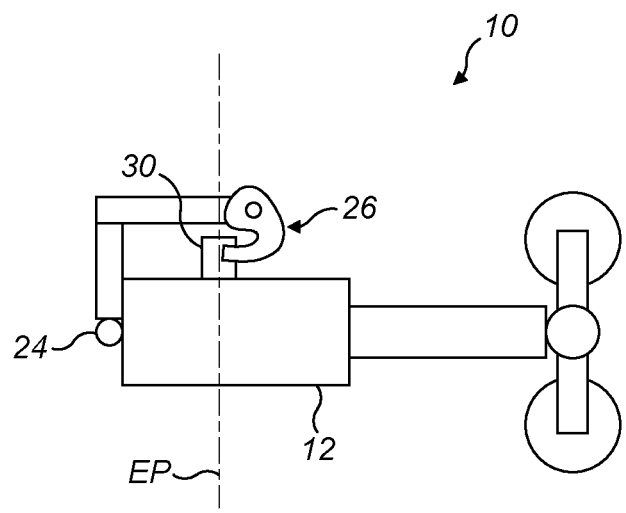

FIGS. 1a and 1b show a landing gear assembly 10 including an up-lock assembly 26, 30.

The landing gear assembly includes a main fitting 12 that telescopically carries a slider 14 to form a shock absorber. A lower part of the slider 14 is pivotally coupled to a bogie beam 16 via pivot pin 18. The bogie beam 16 carries a number of wheel and brake assemblies 20. It will however be appreciated that the landing gear can include a rigid main strut in place of the shock absorbing strut 12, 14 and can have any form of ground contacting assembly.

The main fitting 12 is pivotally coupled to the airframe 22 via a pivot pin 24 so as to be moveable by a retraction actuator (not shown) between a deployed condition, shown in FIG. 1a, and a stowed condition, shown in FIG. 1b.

An up-lock pin 30 is mounted to the main fitting 12 and configured to be captured by a hook 26 movably mounted to the airframe 22 via pin joint 28 so as to hold the landing gear assembly in a stowed condition.

Figure 2:
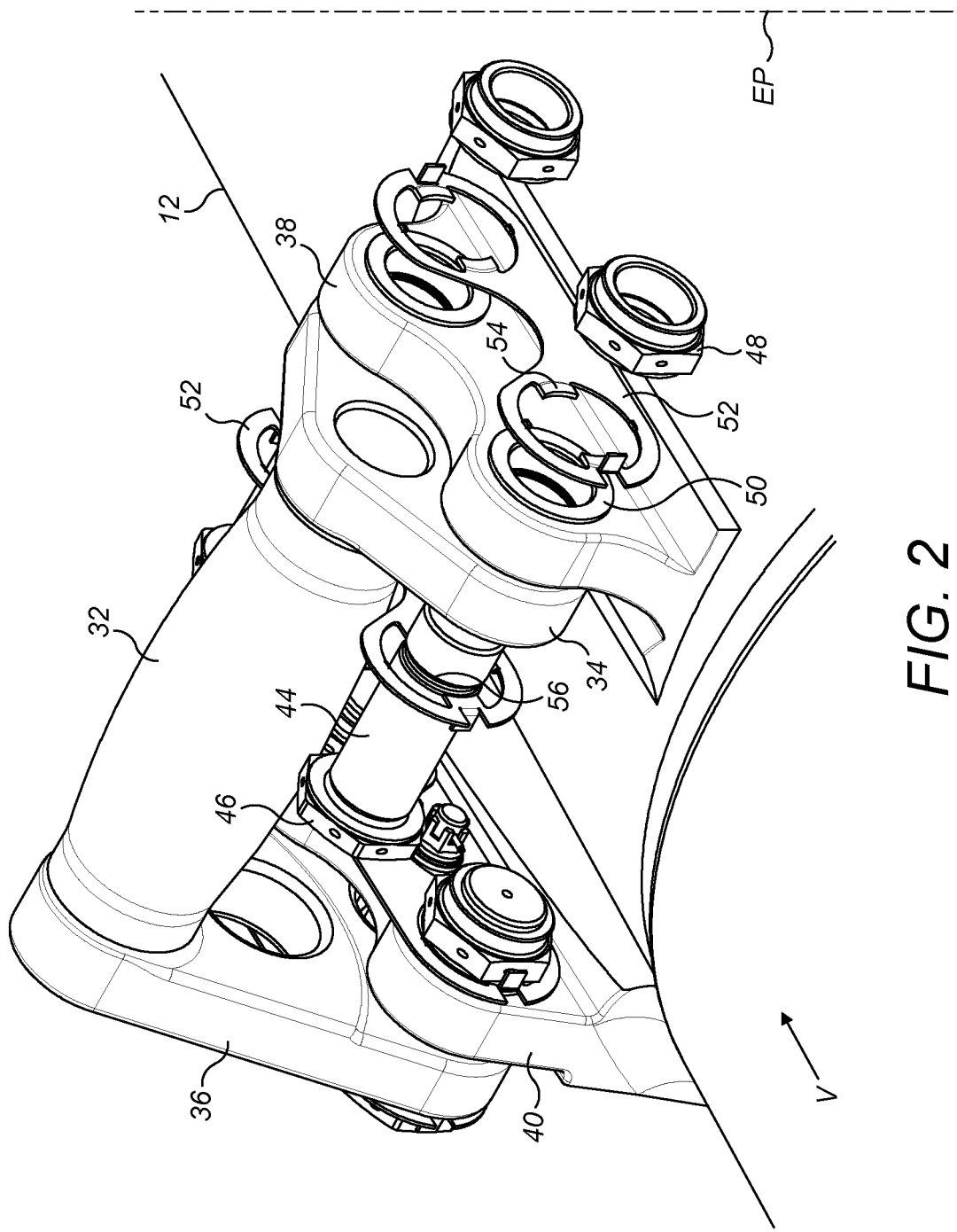
FIG. 2 is a diagram focussing on the up-lock pin of the landing gear assembly of FIGS. 1a and 1b.

Referring additionally to FIG. 2, the up-lock pin 30 has a transverse pin member 32 which is carried between a pair of parallel pin mounting lug members 34, 36. The pin mounting lugs 34, 36 are plate-like so as to have generally planar outer faces. The main fitting 12 is also provided with a pair of parallel strut lug members 38, 40 arranged such that the pin mounting lugs 34, 36 can be coupled to the strut lugs 38, 40 to mount the up-lock pin 30 on the main fitting 12. Plane EP is shown to relate FIG. 2 to FIG. 1b.

Figure 3:
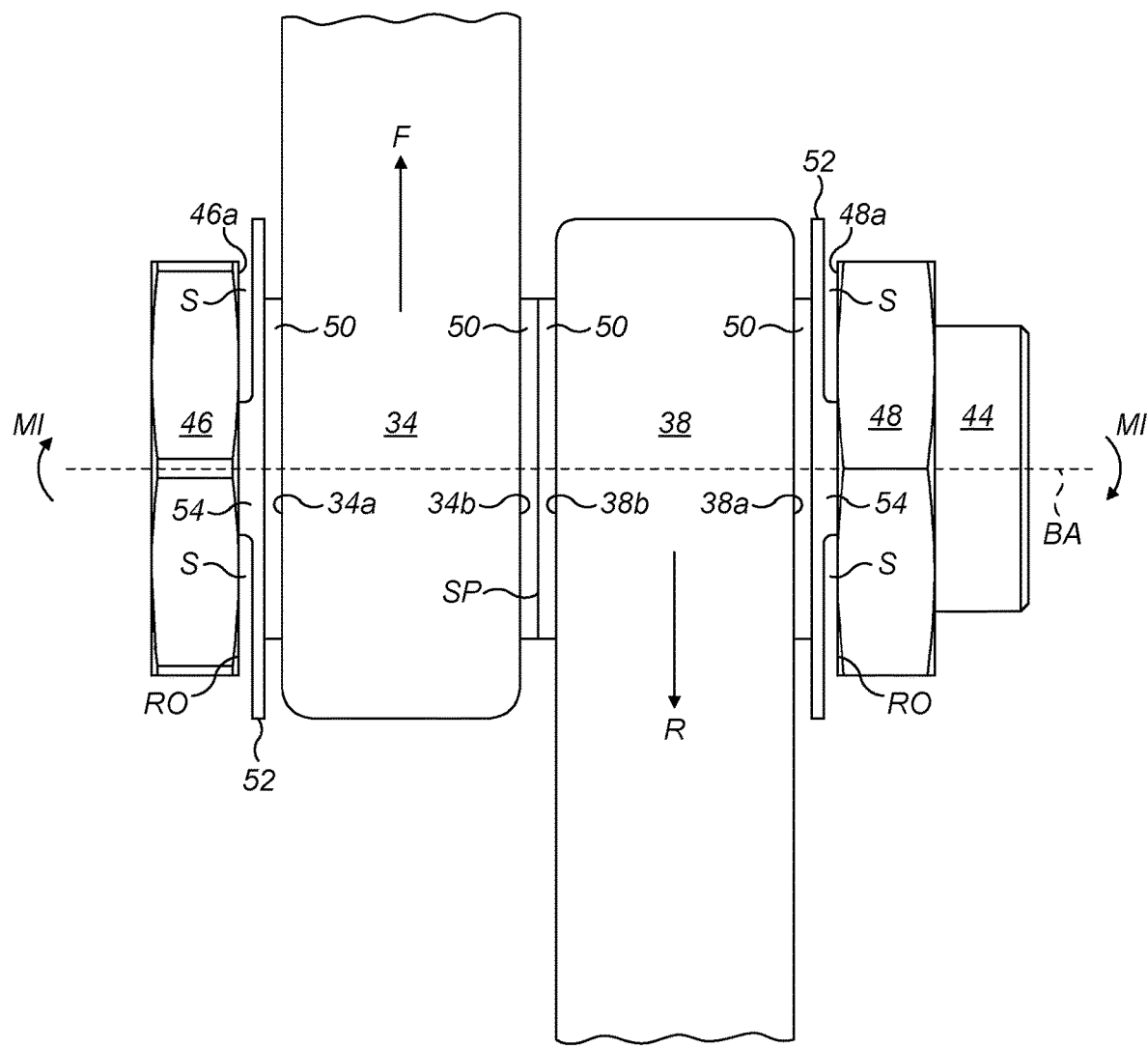
FIG. 3 is a side view of the up-lock pin of FIG. 2 focussing on a lug pair which defines a single shear bolted assembly.
Figure 4:
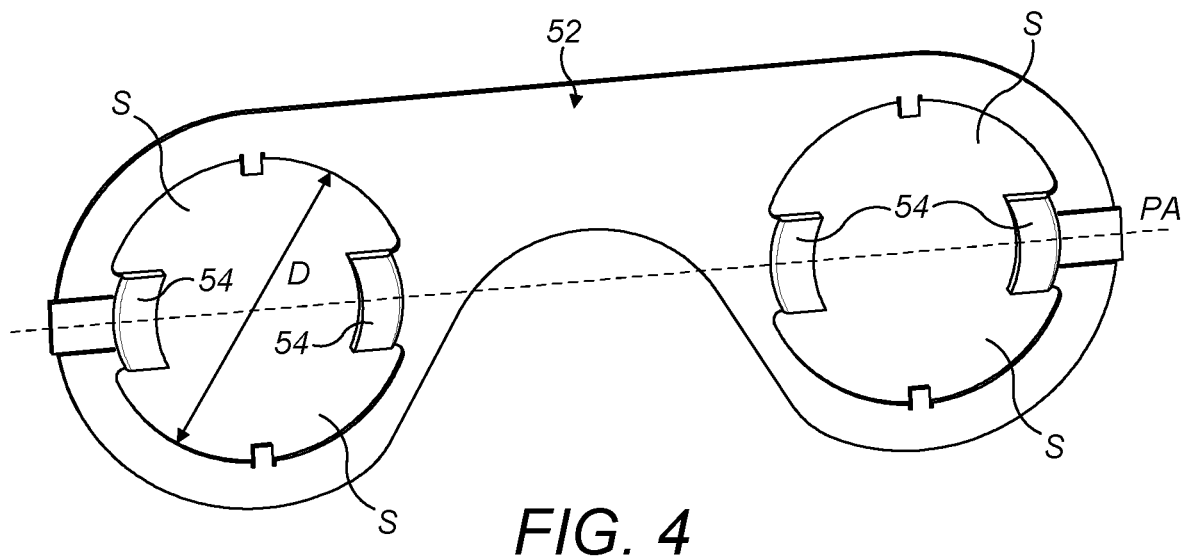
FIG. 4 is a diagram of a spacer of the single shear bolted assembly of FIG. 3.

Referring additionally to FIGS. 3 and 4, each of the lugs 34, 36, 38, 40 includes one or more holes formed through them. Each hole is arranged to receive a bolt 44 to secure a pair of the lugs 34, 36, 38, 40 together. A bolt 44, which includes a radially enlarged head 46, is inserted through the holes of a lug pair 34, 38 so as to couple them to one another and inhibit relative movement in a sheer plane SP. The head 46 defines a first mechanical fixing. A nut 48 is wound onto a threaded end portion of the bolt 44 to define a second mechanical fixing that secures the lug pair 34, 38 together, with an inner axial face 46a of the head 46 applying a direct or indirect clamping force to the flat outer face of the lug 34 and an inner axial face 48a of the nut 48 applying a direct or indirect clamping force to the flat outer face of the lug 38.

In this embodiment, a pair of outwardly facing flanged bushes 50 are mounted in each lug hole. The bushes 50 can be retained in the holes in a conventional manner, such as by way of an interference fit, bonding or the like. However, bushes need not be provided.

The landing gear assembly also includes spacers, which in the illustrated embodiment are defined by spacer plates 52. Each spacer plate 52 includes a plate-like body including holes which correspond to the holes formed through the lugs and which are arranged to receive the bolt 44 such that the plate 52 can be situated between an outer face of a lug and a corresponding fixing. For example, as illustrated in FIG. 3, a first spacer plate 52 is provided between the nut 48 and the outer face 38a of the strut lug 38. The plate 52 is shown in contact with the bush 50, but where bushes are not provided the plate 52 can directly contact the outer face 38a of the strut lug 38.

In embodiments of the invention, each space defines one or more land regions 54 arranged to limit how close a fixing can be moved along the bolt towards the respective lug member such that, when tightened, the axial faces of the fixing are axially spaced from the outer faces of the lug members. In the illustrated embodiment the spacer plate 52 includes a pair of prominent land regions 54 arranged to be engaged by the nut 48 so as to be compressed between the nut 48 and the mounting lug 38 when the nut 48 is tightened.

In embodiments of the invention, each spacer 52 further defines one or more voids S arranged to accommodate angular movement of the radial outer portion of the fixing due to bolt deflection. In the illustrated embodiment the land regions 54 create voids S where the axial inner face of the nut 48 is spaced from the outer face of the lug members.

In use, when the up-lock 26 engages the pin 32 to hold the landing gear assembly 10 in the stowed condition, a force F is applied to the pin mounting lugs 34, 36 in the direction shown in FIG. 3. This force is reacted by the strut lugs 38, 40 in the direction of force R shown in FIG. 3. Thus, the members, bolt and the fixings which join them define a single shear bolted assembly. This loading of the first member 34 can cause a moment imbalance in the bolt 44, thereby causing deflection of the bolt 44 which causes the mechanical fixings 46, 48 to pivot in the directions of arrows MI so as to define a pivot axis (not shown). The voids S defined by the spacer plates 52 accommodate such deflection so that the radial outer parts RO of the fixings 46, 48 move into the voids S. As such, the load applied to the first member 34 is reacted primarily by the bolt 44 and the members 34, 38, rather than by the fixings 44, 46. Although the land regions 54 can result in some load being transferred to the fixings, the magnitude of the load is smaller than would be the case in a conventional arrangement where substantially all of the inner axial face of a fixing engages an outer face of one of the members. The voids S can therefore enable the size and/or weight of the fixing and/or bolt to be reduced without affecting the likelihood of the fixing failing in use, which is particularly advantageous in the context of an aircraft assembly. It is preferred that the voids S are sized such that upon application of the load, the fixings 46, 48 do not contact the members 34, 38, or any load transferring parts which are provided between them between them such as the bushes 50 or the plates 52.

As will be appreciated, the landing gear assembly includes other single sheer bolted assemblies. The other single sheer bolted assemblies can each have the same or a similar configuration to that shown in FIG. 3.

As illustrated in FIG. 2, it is common for aircraft landing gear assembly bolts to include a circumferential recess 56 at the end of the threaded section. It is common for such a recesses 56 to be situated in the region where a nut engages the bush or spacer plate. As such, the invention is particularly advantageous in the context of an aircraft landing gear because loading at these weak spots is reduced by the spacers.

A spacer plate 52 is shown in isolation in FIG. 4. Each spacer plate 52 can have the same or a similar configuration. The voids S in this embodiment are defined by a single circular hole having a diameter D which is greater than the diameter of the mechanical fixing to which it is arranged to be used with. The land regions 54 extend into the hole and have a thickness which is greater than the thickness of the spacer plate 52. As such, the difference in thickness between the land regions 54 and the plate 52 creates a first portion of space between a fixing and a member, and the remaining parts of the hole create an additional portion of space which is equal to the thickness of the plate 52.

Figure 5:
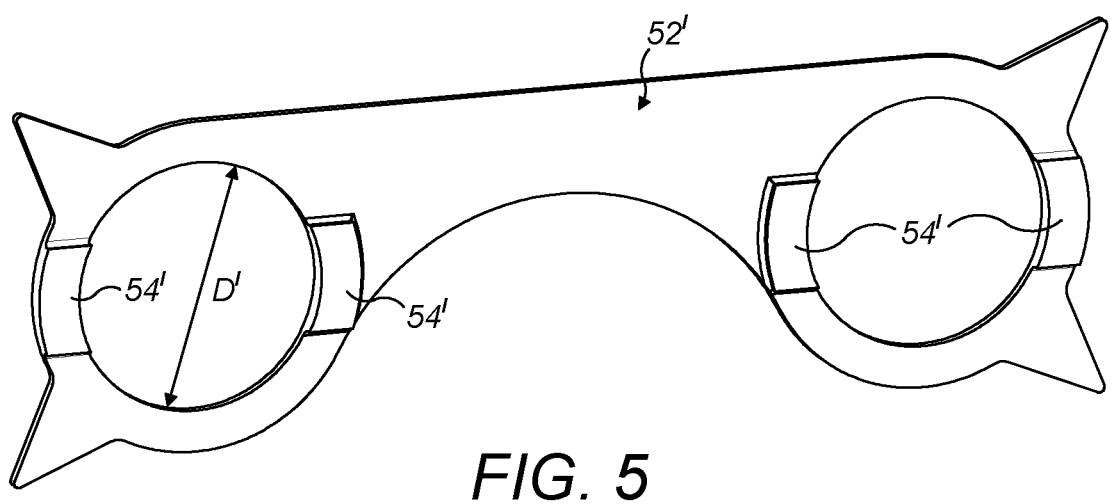
FIG. 5 is a diagram of a spacer of a landing gear assembly according to a further embodiment of the invention.

Referring now to FIG. 5, in another embodiment the spacer plate 52' can include holes which are sized to receive the bolt, but which have a diameter D' that is less than the diameter of the mechanical fixing that they are arranged to be used with. Again, the land regions 54' have a thickness which is greater than the thickness of the plate 52'. In such embodiments, the void S is defined only by the difference in thickness between the land regions 54' and the thickness of the plate 52'. The other spacer plates can have the same or a similar configuration.

Figure 6:
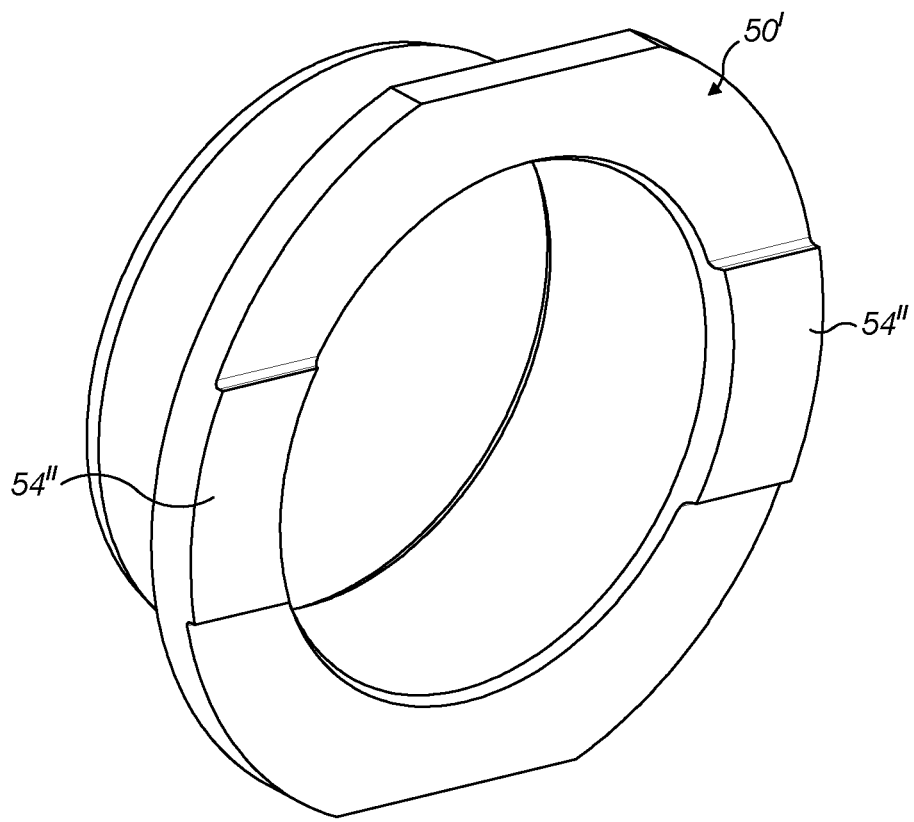
FIG. 6 is a diagram of a spacer of a landing gear assembly according to a further embodiment of the invention.

In a further embodiment, illustrated in FIG. 6, the voids S can be defined by the bushes 50'. As illustrated, bush 50' includes prominent land regions 54" which define voids in the same way as described with reference to FIG. 3. The other bushes can have the same or a similar configuration.

In a further embodiment (not shown) bushes can be omitted and the outer faces of the lug members can be provided with land regions which define voids.

In a further embodiment (not shown) the mechanical fixings can be provided with land regions which define voids. This is however a less preferred arrangement due to the possibility of the orientation of the fixing changing such that the land regions do not coincide with the bolt pivot axis, so as to define the voids in the appropriate places to accommodate angular movement of the fixings.

While the embodiments have been described with respect to a landing gear assembly up lock, it will be appreciated that in other embodiments the landing gear assembly can include other single shear bolted assemblies; for example, lock-stay actuator mounting lugs.

Although the invention has been described above with reference to one or more preferred embodiments, it will be appreciated that various changes or modifications can be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. An aircraft landing gear assembly comprising:
   a first member having an inner face, an outer face and a first hole providing communication between the inner face and outer face;
   a second member having an inner face, an outer face and a second hole providing communication between the inner face and outer face, the second member being disposed in parallel with the first member with the inner faces of each member facing one another;
   a bolt provided through the first and second holes to couple the first member to the second member, the bolt being longer than the combined thicknesses of the first and second members so as to have protruding first and second end portions;
   a first mechanical fixing mounted on the first end portion of the bolt and having an inner axial face arranged to apply a clamping force to the outer face of the first member; and
   a second mechanical fixing mounted on the second end portion of the bolt and having an inner axial face arranged to apply a clamping force to the outer face of the second member;
   wherein the first member is arranged in use to be loaded in a first direction and the second member is anchored to react the load in a second direction, thereby causing deflection of the bolt such that a radially outer region of each fixing is biased to move towards the outer face of the respective member; and
   wherein the assembly includes one or more spacers, each spacer defining one or more contact regions and one or more voids and being provided between the inner axial face of one of the fixings and the outer face of the respective member such that the contact regions separate the fixing from the member and the voids are positioned such that angular movement of the fixing due to deflection of the bolt causes the radially outermost point on the fixing sidewall to move into one of the voids.

2. The aircraft landing gear assembly according to claim 1, wherein one or more of the spacers are each defined by projections on an outer axial face of a bush located within one of the holes, the remainder of the axial face of the bush defining the voids.

3. The aircraft landing gear assembly according to claim 1, wherein one or more of the spacers are each defined by projections on an inner axial face of a fixing, the remainder of the axial face defining the voids.

4. The aircraft landing gear assembly according to claim 1, wherein the members each define two or more holes and the assembly includes a further bolt, further first and second mechanical fixings and further spacers for each pair of holes, the further bolt, further fixings and further spacers being substantially similar to the bolt, the first and second fixings and the spacers.

5. The aircraft landing gear assembly according to claim 1, wherein the assembly further comprises third and fourth members, each of which defines one, two or more holes and the assembly includes a further bolt, a further pair of fixings and a further pair of spacers for each pair of holes, the further bolt, further fixings and further spacers being substantially similar to the bolt, the first and second fixings and the spacers.

6. The aircraft landing gear assembly according to claim 1, wherein the aircraft landing gear assembly further comprises:
  a main strut including a joint arranged to be movably coupled to the airframe of an aircraft such that the strut is movable between a stowed condition for flight and a deployed condition for take-off and landing; and
  a lock assembly comprising:
    an elongate pin defining or coupled to the first member, with the second member being mounted on the main strut; and
    a hook movably coupled to the airframe and being arranged to be moved to an engagement condition for engagement with the pin when the strut is in the stowed condition in order to apply a biasing force to the pin to maintain the strut in the stowed condition.

7. The aircraft landing gear assembly according to claim 1, wherein the bolt includes a threaded portion with a head defining the first fixing, the bolt being arranged to be coupled to a nut defining the second fixing, and the bolt includes a circumferential groove located at the end of a threaded portion of the bolt.

8. The aircraft landing gear assembly according to claim 1, wherein the holes through member pairs are coaxial and/or the inner faces of the members are flat.

9. The aircraft landing gear assembly according to claim 1, wherein the one or more contact regions of each spacer are located at or relatively closer to the pivot axis of the respective fixing about which the bolt is arranged to deflect in comparison to the voids.

10. The aircraft landing gear assembly according to claim 9, wherein the one or more contact regions of each spacer are located at and extend along the pivot axis of the respective fixing.

11. The aircraft landing gear assembly according to claim 9, wherein the one or more voids on each spacer are located relatively further from the pivot axis in comparison to the contact regions.

12. The aircraft landing gear assembly according to claim 1, wherein one or more of the spacers can each be defined by a plate located between a fixing and a respective member, the plate defining the one or more contact regions.

13. The aircraft landing gear assembly according to claim 12, wherein the contact regions are defined by projections on the plate, such that the difference in thickness between the contact regions and the plate defines the voids and optionally additionally by holes formed through the plate.

14. The aircraft landing gear assembly according to claim 12, wherein the contact regions are defined by the thickness of the plate, with the voids being defined by holes formed though the plate.

15. An aircraft including one or more aircraft landing gear, each landing gear comprising:
  a first member having an inner face, an outer face and a first hole providing communication between the inner face and outer face;
  a second member having an inner face, an outer face and a second hole providing communication between the inner face and outer face, the second member being disposed in parallel with the first member with the inner faces of each member facing one another;
  a bolt provided through the first and second holes to couple the first member to the second member, the bolt being longer than the combined thicknesses of the first and second members so as to have protruding first and second end portions;
  a first mechanical fixing mounted on the first end portion of the bolt and having an inner axial face arranged to apply a clamping force to a flat outer face of the first member; and
  a second mechanical fixing mounted on the second end portion of the bolt and having an inner axial face arranged to apply a clamping force to a flat outer face of the second member;
  wherein the first member is arranged in use to be loaded in a first direction and the second member is anchored to react the load in a second direction, thereby causing deflection of the bolt such that a radially outer region of each fixing is biased to move towards the flat outer face of the respective member; and
  wherein the assembly includes one or more spacers, each spacer defining one or more contact regions and one or more voids and being provided between the inner axial face of one of the fixings and the flat outer face of the respective member such that the contact regions separate the fixing from the member and the voids are positioned such that angular movement of the fixing due to deflection of the bolt causes the radially outermost point on the fixing sidewall to move into one of the voids.

16. The aircraft landing gear assembly according to claim 1, wherein the contact regions are configured to contact the fixing and the member to separate the fixing from the member.

* * * * *